United States Patent
Gordon et al.

(10) Patent No.: US 10,152,060 B2
(45) Date of Patent: Dec. 11, 2018

(54) PROTECTING CONTENTS OF A SMART VAULT BEING TRANSPORTED BY A SELF-DRIVING VEHICLE

(71) Applicant: International Business Machines Corporation, Armonk, NY (US)

(72) Inventors: Michael S. Gordon, Yorktown Heights, NY (US); Ashish Kundu, Elmsford, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 15/452,952

(22) Filed: Mar. 8, 2017

(65) Prior Publication Data

US 2018/0259965 A1  Sep. 13, 2018

(51) Int. Cl.
| | |
|---|---|
| *G05D 1/02* | (2006.01) |
| *G05D 1/00* | (2006.01) |
| *G05D 1/10* | (2006.01) |
| *B60R 25/01* | (2013.01) |
| *B60R 25/30* | (2013.01) |
| *G01C 22/00* | (2006.01) |

(52) U.S. Cl.
CPC ........... *G05D 1/0214* (2013.01); *B60R 25/01* (2013.01); *B60R 25/30* (2013.01); *G05D 1/0088* (2013.01); *G05D 1/102* (2013.01)

(58) Field of Classification Search
CPC .... G06F 11/30; G05D 1/0214; G05D 1/0088; G05D 1/102; B60R 25/01; B60R 25/30
USPC ............................. 701/24; 180/170; 713/200
See application file for complete search history.

(56) References Cited

U.S. PATENT DOCUMENTS

| | | | |
|---|---|---|---|
| 4,665,395 A | 5/1987 | Van Ness | |
| 4,908,988 A | 3/1990 | Yamamura et al. | |
| 5,975,791 A | 11/1999 | McCulloch | |
| 6,064,970 A | 5/2000 | McMillian et al. | |
| 6,201,318 B1 | 3/2001 | Guillory | |
| 6,326,903 B1 | 12/2001 | Gross et al. | |

(Continued)

FOREIGN PATENT DOCUMENTS

| | | |
|---|---|---|
| CN | 1135063 | 11/1996 |
| CN | 2349068 Y | 11/1999 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Gertrude Arthur Jeanglaude
(74) *Attorney, Agent, or Firm* — Law Office of Jim Boice

(57) ABSTRACT

A method reduces a risk exposure to an item being transported by a self-driving vehicle (SDV). One or more processors determine a risk-level R for contents of a smart vault that is being transported by the SDV, where R describes a real-time risk of the contents being stolen from the smart vault while being transported by the SDV. In response to determining that R is greater than a predefined risk value, one or more processors electronically communicate an executable instruction to a SDV on-board computer to take a risk-lowering action that will reduce the level of R.

20 Claims, 8 Drawing Sheets

(56) References Cited

U.S. PATENT DOCUMENTS

| | | | |
|---|---|---|---|
| 6,393,362 B1 | 5/2002 | Burns | |
| 6,502,035 B2 | 12/2002 | Levine | |
| 6,587,043 B1 | 7/2003 | Kramer | |
| 6,622,082 B1 | 9/2003 | Schmidt et al. | |
| 6,731,202 B1 | 5/2004 | Klaus | |
| 6,810,312 B2 | 10/2004 | Jammu et al. | |
| 7,124,088 B2 | 10/2006 | Bauer et al. | |
| 7,580,782 B2 | 8/2009 | Breed et al. | |
| 7,769,544 B2 | 8/2010 | Blesener et al. | |
| 7,877,269 B2 | 1/2011 | Bauer et al. | |
| 7,894,951 B2 | 2/2011 | Norris et al. | |
| 7,979,173 B2 | 7/2011 | Breed | |
| 8,031,062 B2 | 10/2011 | Smith | |
| 8,045,455 B1 | 10/2011 | Agronow et al. | |
| 8,078,349 B1 | 12/2011 | Prada Gomez et al. | |
| 8,090,598 B2 | 1/2012 | Bauer et al. | |
| 8,139,109 B2 | 3/2012 | Schmiedel et al. | |
| 8,140,358 B1 | 3/2012 | Ling et al. | |
| 8,146,703 B2 | 4/2012 | Baumann et al. | |
| 8,152,325 B2 | 4/2012 | McDermott | |
| 8,180,322 B2 | 5/2012 | Lin et al. | |
| 8,346,480 B2 | 1/2013 | Trepagnier et al. | |
| 8,352,112 B2 | 1/2013 | Mudalige | |
| 8,442,854 B2 | 5/2013 | Lawton et al. | |
| 8,466,807 B2 | 6/2013 | Mudalige | |
| 8,489,434 B1 | 7/2013 | Otis et al. | |
| 8,583,365 B2 | 11/2013 | Jang et al. | |
| 8,660,734 B2 | 2/2014 | Zhu et al. | |
| 8,676,466 B2 | 3/2014 | Mudalige | |
| 8,678,701 B1 | 3/2014 | Aldasem | |
| 8,781,964 B2 | 7/2014 | Martin et al. | |
| 8,786,461 B1 | 7/2014 | Daudelin | |
| 8,810,392 B1 | 8/2014 | Teller et al. | |
| 8,816,857 B2 | 8/2014 | Nordin et al. | |
| 8,874,305 B2 | 10/2014 | Dolgov et al. | |
| 8,880,270 B1 | 11/2014 | Ferguson et al. | |
| 8,903,591 B1 | 12/2014 | Ferguson et al. | |
| 8,928,479 B2 | 1/2015 | Gonsalves et al. | |
| 8,948,955 B2 | 2/2015 | Zhu et al. | |
| 8,949,016 B1 | 2/2015 | Ferguson et al. | |
| 8,954,217 B1 | 2/2015 | Montemerlo et al. | |
| 8,954,252 B1 | 2/2015 | Urmson et al. | |
| 8,954,261 B2 | 2/2015 | Das et al. | |
| 8,958,943 B2 | 2/2015 | Bertosa et al. | |
| 8,965,621 B1 | 2/2015 | Urmson et al. | |
| 8,970,362 B2 | 3/2015 | Morley et al. | |
| 8,983,705 B2 | 3/2015 | Zhu et al. | |
| 8,996,224 B1 | 3/2015 | Herbach et al. | |
| 9,014,905 B1 | 4/2015 | Kretzschmar et al. | |
| 9,024,787 B2 | 5/2015 | Alshinnawi et al. | |
| 9,123,049 B2 | 9/2015 | Hyde et al. | |
| 9,170,327 B2 | 10/2015 | Choe et al. | |
| 9,189,897 B1 | 11/2015 | Stenneth | |
| 9,194,168 B1 | 11/2015 | Lu et al. | |
| 9,216,745 B2 | 12/2015 | Beardsley et al. | |
| 9,218,698 B2 | 12/2015 | Ricci | |
| 9,286,520 B1 | 3/2016 | Lo et al. | |
| 9,317,033 B2 | 4/2016 | Ibanez-guzman et al. | |
| 9,390,451 B1 | 7/2016 | Slusar | |
| 9,399,472 B2 | 7/2016 | Minoiu-Enache | |
| 9,463,805 B2 | 10/2016 | Kirsch et al. | |
| 9,483,948 B1 | 11/2016 | Gordon et al. | |
| 9,552,735 B2 | 1/2017 | Pilutti et al. | |
| 9,566,958 B2 | 2/2017 | Waldmann | |
| 9,566,986 B1 | 2/2017 | Gordon et al. | |
| 9,628,975 B1 | 4/2017 | Watkins et al. | |
| 9,646,496 B1 | 5/2017 | Miller | |
| 9,834,224 B2 | 12/2017 | Gordon et al. | |
| 2001/0056544 A1* | 12/2001 | Walker | B60R 25/02 726/2 |
| 2002/0026841 A1 | 3/2002 | Svendsen | |
| 2002/0128774 A1 | 9/2002 | Takezaki et al. | |
| 2003/0065572 A1 | 4/2003 | McNee et al. | |
| 2003/0076981 A1 | 4/2003 | Smith et al. | |
| 2004/0078133 A1 | 4/2004 | Miller | |
| 2004/0199306 A1 | 10/2004 | Helmann et al. | |
| 2005/0021227 A1 | 1/2005 | Matsumoto et al. | |
| 2005/0104745 A1 | 5/2005 | Bachelder et al. | |
| 2006/0106671 A1 | 5/2006 | Biet | |
| 2006/0163939 A1 | 7/2006 | Kuramochi et al. | |
| 2006/0200379 A1 | 9/2006 | Biet | |
| 2006/0241855 A1 | 10/2006 | Joe et al. | |
| 2007/0100687 A1 | 5/2007 | Yoshikawa | |
| 2007/0124027 A1 | 5/2007 | Betzitza et al. | |
| 2008/0048850 A1 | 2/2008 | Yamada | |
| 2008/0065293 A1 | 3/2008 | Placke et al. | |
| 2008/0091309 A1* | 4/2008 | Walker | B60R 25/02 701/1 |
| 2008/0114663 A1 | 5/2008 | Watkins et al. | |
| 2008/0129475 A1 | 6/2008 | Breed et al. | |
| 2008/0201217 A1 | 8/2008 | Bader et al. | |
| 2008/0288406 A1 | 11/2008 | Seguin et al. | |
| 2009/0094109 A1 | 4/2009 | Aaronson et al. | |
| 2009/0138168 A1 | 5/2009 | Labuhn et al. | |
| 2009/0248231 A1 | 10/2009 | Kamiya | |
| 2009/0313096 A1 | 12/2009 | Kama | |
| 2010/0057511 A1 | 3/2010 | Mansouri et al. | |
| 2010/0156672 A1 | 6/2010 | Yoo et al. | |
| 2010/0179720 A1 | 7/2010 | Lin et al. | |
| 2010/0228427 A1 | 9/2010 | Anderson et al. | |
| 2010/0256852 A1 | 10/2010 | Mudalige | |
| 2011/0029173 A1 | 2/2011 | Hyde et al. | |
| 2011/0035250 A1 | 2/2011 | Finucan | |
| 2011/0077807 A1 | 3/2011 | Hyde et al. | |
| 2011/0077808 A1 | 3/2011 | Hyde et al. | |
| 2011/0137699 A1 | 6/2011 | Ben-Ari et al. | |
| 2011/0264521 A1 | 10/2011 | Straka | |
| 2012/0072243 A1 | 3/2012 | Collins et al. | |
| 2012/0139756 A1 | 6/2012 | Djurkovic | |
| 2012/0277947 A1 | 11/2012 | Boehringer et al. | |
| 2012/0293341 A1 | 11/2012 | Lin | |
| 2013/0030657 A1 | 1/2013 | Chatterjee et al. | |
| 2013/0113634 A1 | 5/2013 | Hutchinson et al. | |
| 2013/0131949 A1 | 5/2013 | Shida | |
| 2013/0144502 A1 | 6/2013 | Shida | |
| 2013/0231824 A1 | 9/2013 | Wilson et al. | |
| 2013/0261871 A1 | 10/2013 | Hobbs et al. | |
| 2014/0019259 A1 | 1/2014 | Dung et al. | |
| 2014/0088850 A1 | 3/2014 | Schuberth | |
| 2014/0092332 A1 | 4/2014 | Price | |
| 2014/0095214 A1 | 4/2014 | Mathe et al. | |
| 2014/0129073 A1 | 5/2014 | Ferguson | |
| 2014/0136045 A1 | 5/2014 | Zhu et al. | |
| 2014/0136414 A1 | 5/2014 | Abhyanker | |
| 2014/0164126 A1 | 6/2014 | Nicholas et al. | |
| 2014/0188999 A1 | 7/2014 | Leonard et al. | |
| 2014/0195213 A1 | 7/2014 | Kozloski et al. | |
| 2014/0201037 A1 | 7/2014 | Mallawarachchi et al. | |
| 2014/0201126 A1 | 7/2014 | Zadeh | |
| 2014/0214255 A1 | 7/2014 | Dolgov et al. | |
| 2014/0214260 A1 | 7/2014 | Eckert et al. | |
| 2014/0222277 A1 | 8/2014 | Tsimhoni et al. | |
| 2014/0222577 A1 | 8/2014 | Abhyanker | |
| 2014/0282967 A1 | 9/2014 | Maguire | |
| 2014/0297116 A1 | 10/2014 | Anderson et al. | |
| 2014/0306833 A1 | 10/2014 | Ricci | |
| 2014/0309789 A1 | 10/2014 | Ricci | |
| 2014/0309806 A1 | 10/2014 | Ricci | |
| 2014/0309864 A1 | 10/2014 | Ricci | |
| 2014/0309891 A1 | 10/2014 | Ricci | |
| 2014/0310186 A1 | 10/2014 | Ricci | |
| 2014/0316671 A1 | 10/2014 | Okamoto | |
| 2014/0324268 A1 | 10/2014 | Montemerlo et al. | |
| 2014/0330479 A1 | 11/2014 | Dolgov | |
| 2014/0358331 A1 | 12/2014 | Prada Gomez et al. | |
| 2014/0358353 A1 | 12/2014 | Ibanez-Guzman et al. | |
| 2015/0006005 A1 | 1/2015 | Yu et al. | |
| 2015/0006014 A1 | 1/2015 | Wimmer et al. | |
| 2015/0026092 A1 | 1/2015 | Abboud et al. | |
| 2015/0035685 A1 | 2/2015 | Strickland et al. | |
| 2015/0051778 A1 | 2/2015 | Mueller | |
| 2015/0057891 A1 | 2/2015 | Mudalige et al. | |
| 2015/0062340 A1 | 3/2015 | Datta et al. | |
| 2015/0062469 A1 | 3/2015 | Fleury | |

(56) References Cited

U.S. PATENT DOCUMENTS

| | | |
|---|---|---|
| 2015/0066282 A1 | 3/2015 | Yopp |
| 2015/0066284 A1 | 3/2015 | Yopp |
| 2015/0070178 A1 | 3/2015 | Kline |
| 2015/0088358 A1 | 3/2015 | Yopp |
| 2015/0095190 A1 | 4/2015 | Hammad et al. |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson |
| 2015/0149018 A1 | 5/2015 | Attard et al. |
| 2015/0149021 A1 | 5/2015 | Duncan et al. |
| 2015/0160019 A1 | 6/2015 | Biswal et al. |
| 2015/0166059 A1 | 6/2015 | Ko |
| 2015/0196256 A1 | 7/2015 | Venkatraman et al. |
| 2015/0232065 A1 | 8/2015 | Ricci et al. |
| 2015/0242953 A1 | 8/2015 | Suiter |
| 2015/0293994 A1 | 10/2015 | Kelly |
| 2015/0338226 A1 | 11/2015 | Mason et al. |
| 2015/0339639 A1 | 11/2015 | Choe |
| 2016/0001781 A1 | 1/2016 | Fung et al. |
| 2016/0026182 A1 | 1/2016 | Boroditsky et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0202700 A1 | 7/2016 | Sprigg |
| 2016/0205146 A1 | 7/2016 | Sugioka et al. |
| 2016/0264131 A1 | 9/2016 | Chan et al. |
| 2016/0303969 A1 | 10/2016 | Akula |
| 2016/0334797 A1 | 11/2016 | Ross et al. |
| 2016/0344737 A1 | 11/2016 | Anton |
| 2016/0355192 A1 | 12/2016 | James et al. |
| 2016/0364823 A1 | 12/2016 | Cao |
| 2017/0001650 A1 | 1/2017 | Park |
| 2017/0010613 A1 | 1/2017 | Fukumoto |
| 2017/0021830 A1 | 1/2017 | Feldman et al. |
| 2017/0021837 A1 | 1/2017 | Ebina |
| 2017/0057542 A1 | 3/2017 | Kim et al. |
| 2017/0088143 A1 | 3/2017 | Goldman-Shenhar et al. |
| 2017/0106876 A1 | 4/2017 | Gordon et al. |
| 2017/0123428 A1 | 5/2017 | Levinson et al. |
| 2017/0129487 A1 | 5/2017 | Wulf |
| 2017/0151958 A1 | 6/2017 | Sakuma |
| 2017/0168689 A1 | 6/2017 | Goldman-Shenhar et al. |
| 2017/0200449 A1 | 7/2017 | Penilla et al. |

FOREIGN PATENT DOCUMENTS

| | | |
|---|---|---|
| CN | 1376599 A | 10/2002 |
| CN | 201004265 Y | 1/2008 |
| CN | 201635568 U | 11/2010 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 | 2/1994 |
| WO | 2006003661 A2 | 1/2006 |
| WO | 2014058263 | 4/2014 |
| WO | 2014066721 | 5/2014 |
| WO | 2014147361 | 9/2014 |
| WO | 2014148975 | 9/2014 |
| WO | 2014148976 | 9/2014 |
| WO | 2015024616 | 2/2015 |
| WO | 2015056105 | 4/2015 |
| WO | 2015156146 A1 | 10/2015 |

OTHER PUBLICATIONS

Anonymous, 'System and Method to Target Advertisements for the Right Focus Group'. ip.com, No. 000218285, May 31, 2012, pp. 1-2.

Anonymous, "Car Built-In Mechanism to Enforce Mandatory Self-Driving Mode", ip.com, No. 000234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technology's Benefits, Potential Risks, and Solutions", The Energy Collective, theenergycollective.com, Aug. 19, 2014, pp. 1-7.

Chen S, et al., "A Crash Risk Assessment Model for ROAS Curves". Inproceedings 20th International Technical Conference on the Enhanced Saftey of Vehicles., 2007. Lyon, France.

J. Wei et al., "Towards a Viable Autonomous Driving Research Platform", IEEE, Intelligent Vehicles Symposium (IV), 2013, pp. 1-8.

Anonymous, "Diagnostics Mechanism for Self-Driving Cars to Validate Self-Driving Capabilities", ip.com, Jun. 6, 2014, pp. 1-5. ip.com.

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.Mar. 1-4, 2012, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze Im Umbruch, Springer Berlin Heidelberg, 2015, pp. 539-549.

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www-consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/google-files-patent-for-second-gen-autonomous-vehicle-without-a-steering-wheel-brake-pedal-more.html>.

C. Berger et al., "COTS—Architecture With a Real-Time OS for a Self-Driving Miniature Vehicle", Safecomp 2013—Workshop ASCOMs of the 32nd International Conference on Computer Safety, Reliability and Security, Sep. 2013, Toulouse, France, pp. 1-13.

\* cited by examiner

PROTECTING CONTENTS OF A SMART VAULT BEING TRANSPORTED BY A SELF-DRIVING VEHICLE

BACKGROUND

The present invention relates to the field of vehicles, and specifically to the field of self-driving vehicles. Still more specifically, the present invention relates to the field of using self-driving vehicles to transport cargo.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In an embodiment of the present invention, a method reduces a risk exposure to an item being transported by a self-driving vehicle (SDV). One or more processors determine a risk-level R for contents of a smart vault that is being transported by the SDV, where R describes a real-time risk of the contents being stolen from the smart vault while being transported by the SDV. In response to determining that R is greater than a predefined risk value, one or more processors electronically communicate an executable instruction to a SDV on-board computer to take a risk-lowering action that will reduce the level of R.

The present invention may also be implemented as a computer system and/or a computer program product, based on the method described above.

DETAILED DESCRIPTION

Figure 1:
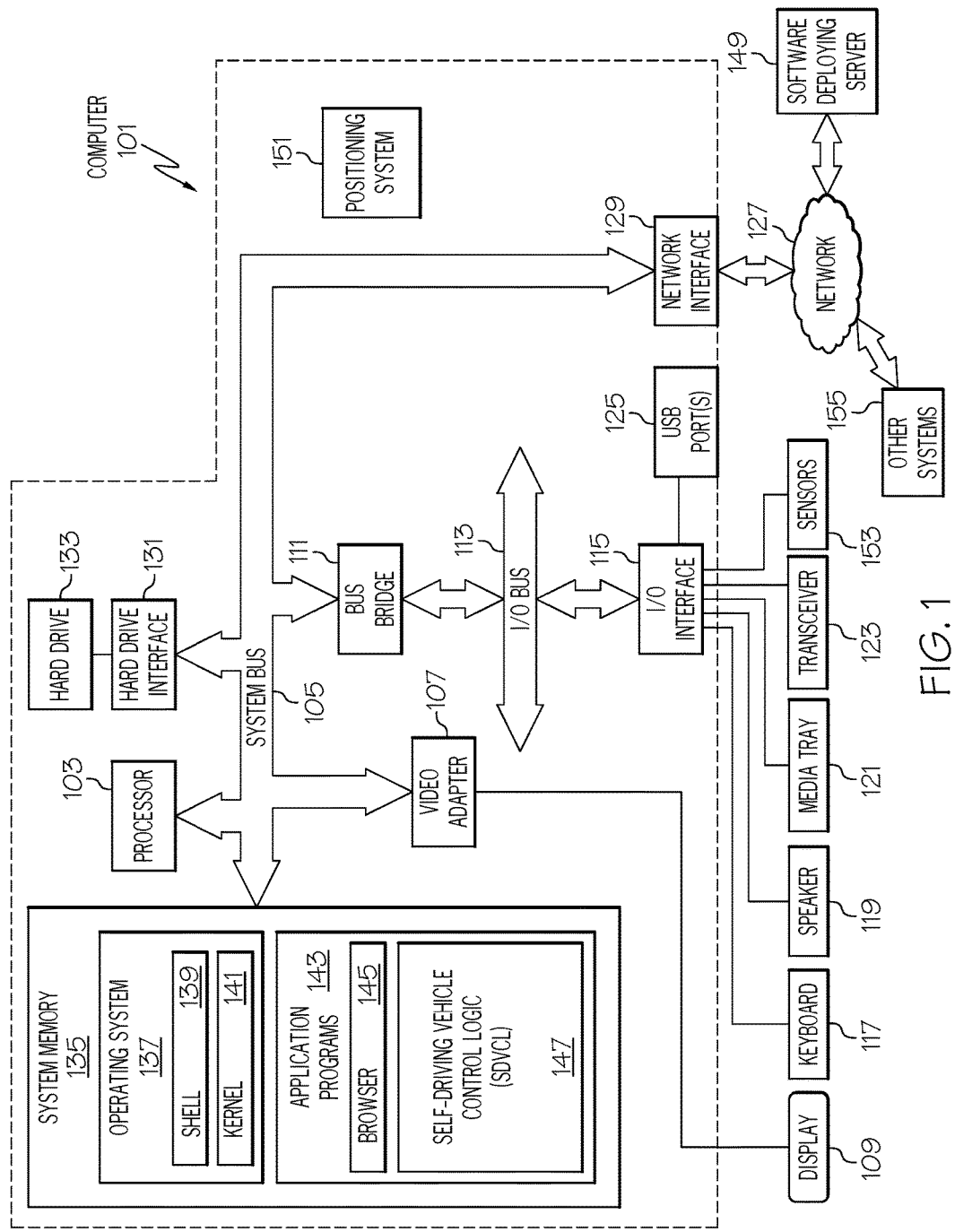
FIG. 1 depicts an exemplary system and network in which the present invention may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be implemented within software deploying server 149 shown in FIG. 1, and/or supervisory computer 201 shown in FIG. 2, and/or a self-driving vehicle (SDV) on-board computer 301 shown in FIG. 3, and/or smart vault controller 411 shown in FIG. 4.

Exemplary computer 101 includes a processor 103 that is coupled to a system bus 105. Processor 103 may utilize one or more processors, each of which has one or more processor cores. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a speaker 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
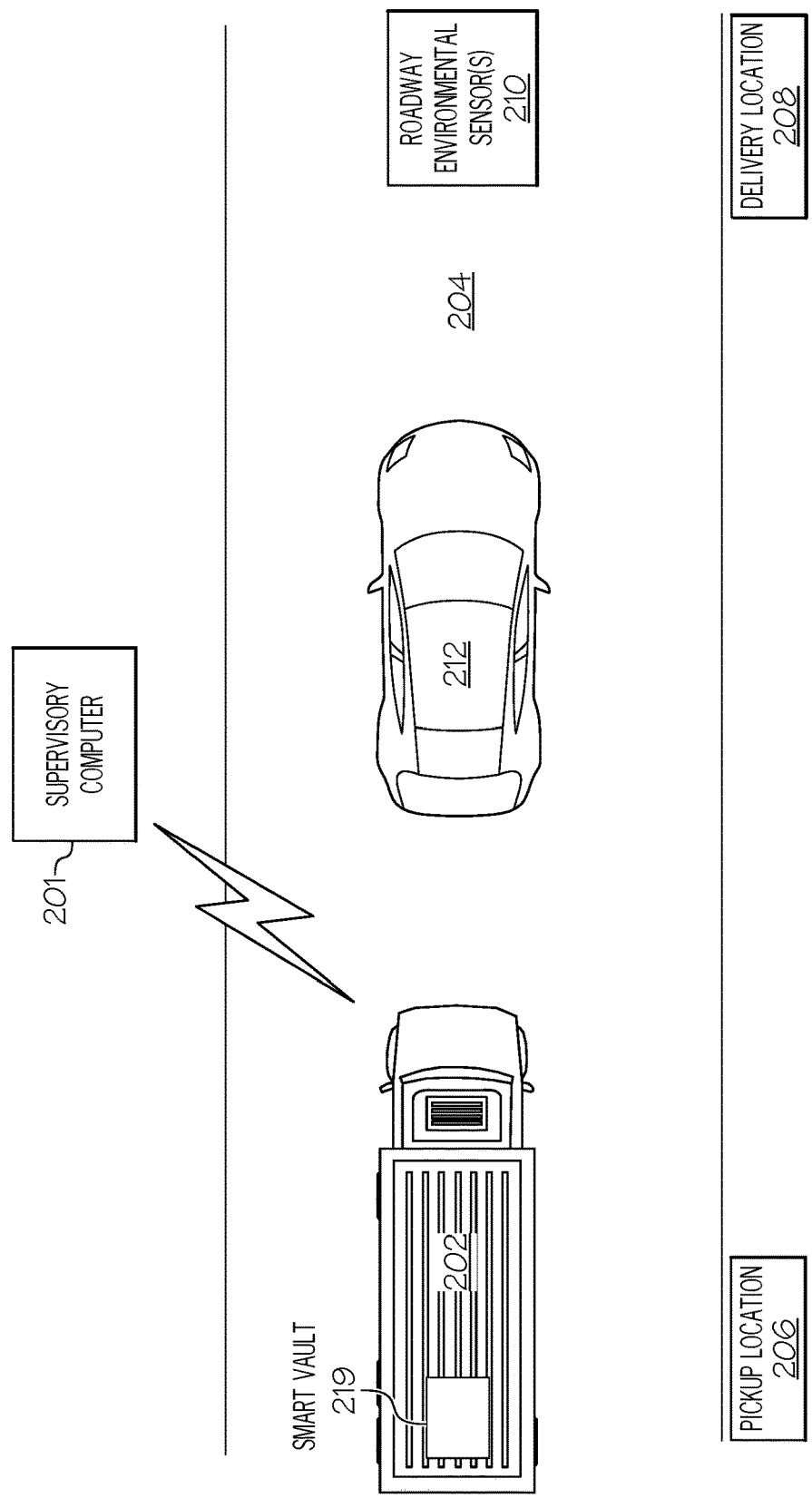
FIG. 2 illustrates an exemplary self-driving vehicle (SDV) transporting cargo in accordance with one or more embodiments of the present invention.

As depicted, computer 101 is able to communicate with a software deploying server 149 and/or other systems 155 (e.g., establishing communication between supervisory computer 201 and SDV 202 shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Self-Driving Vehicle Control Logic (SDVCL) 147. SDVCL 147 includes code for implementing the processes described below, including those described in FIGS. 2-6. In one embodiment, computer 101 is able to download SDVCL 147 from software deploying server 149, including in an on-demand basis, wherein the code in SDVCL 147 is not downloaded until needed for execution. In one embodiment of the present invention, software deploying server 149 performs all of the functions associated with the present invention (including execution of SDVCL 147), thus freeing computer 101 from having to use its own internal computing resources to execute SDVCL 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101 and/or the state of cargo being transported by a self-driving vehicle (SDV). More specifically, when detecting the environment of the SDV, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, microphones (e.g., microphone 331 shown in FIG. 3), light sensors such as light sensor 329 shown in FIG. 3 for detecting how dark a roadway is, chemical sensors for detecting chemical spills on a roadway, moisture detectors, etc. that detect ambient weather conditions, traffic conditions (as detected by the cameras, microphones, etc.), and other environmental conditions of a roadway upon which the SDV is traveling. Similarly, sensors 153 may monitor a smart vault (described below) and/or contents of the smart vault (e.g., cargo being transported within the smart vault) using cameras, microphones, thermometers, smoke detectors, scales, etc. in order to determine the value/presence/state of the cargo and/or any threats (e.g., fire, theft, etc.) to the cargo.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Disclosed herein is a method, system, and computer program product for protecting cargo that is being transported by a self-driving vehicle (SDV). On board the SDV is a smart vault/safe (e.g., protective enclosure), which includes the ability to electronically communicate with an SDV on-board computer that controls the SDV and/or the smart vault/safe. In various embodiments of the present invention, the smart vault is a safe, a deposit box, a cargo compartment of the SDV, etc.

One or more processors within a supervisory computer (e.g., supervisory computer 201 shown in FIG. 2) and/or the SDV on-board computer (e.g., SDV on-board computer 301 shown in FIG. 3) and/or the smart vault/safe (e.g., smart vault 419 shown in FIG. 4) and/or an aerial drone (e.g., aerial drone 406 shown in FIG. 4) determines/detects a risk-level R related to the smart vault and its contents, and then, based on R exceeding a threshold, sends a signal to the SDV on-board computer such that the SDV takes a risk-lowering action.

The present invention contemplates the use of SDVs to transport high-value items such as money, jewelry, important documents, etc. on behalf of enterprises such as businesses, banks, stores, individuals, etc. The use of SDVs for this purpose is especially useful since there is no risk to the life of a human driver or human guard if the SDV is attacked. Furthermore, an SDV (unlike a driver-occupied vehicle) in attempting to evade theft, may perform maneuvers or measures without harm to the vehicle driver or passengers due to violent maneuvers that result in excessive G-forces.

In one or more embodiments of the present invention, the smart vault detects (using sensors described herein) that there is a threat to its contents, and then transmits an electronic communication to the SDV on-board computer. This electronic communication 1) describes the nature of the threat (e.g., fire, theft, etc.) and/or 2) describes a risk-lowering action that should be implemented (e.g., redirecting the movement of the SDV, moving the contents of the smart vault to another transport system, spraying fire retardant on the smart vault, etc.). The electronic communication from the smart vault to the SDV on-board computer may be via a communication pathway that is wired (e.g., a physical communication wire that electronically connects the smart vault to the SDV on-board computer) or wireless (e.g., WiFi, mid-field communications that comport with the IEEE 802.15.1 standard, near-field-communication, etc.). In one or more embodiments of the present invention, this electronic communication between the smart vault and the SDV on-board computer and/or other SDV components is encrypted and protected from man-in-the middle attacks.

In various embodiments of the present invention, the smart vault may be a safe, a deposit box, etc. that is carried within a cargo area on the SDV. In other embodiments of the present invention, the smart vault is the entire cargo area. As described herein, the smart vault may be protected by a lock (e.g., vault locking mechanism 445 shown in FIG. 4), fire protection (e.g., foam sprayer 443 shown in FIG. 4), an emergency removal device (e.g., aerial drone 406 shown in FIG. 4 that is able to physically lift up the smart vault 419 or at least contents 410 and fly them away from the threat), etc. that can protect the contents (e.g., contents 410) of the smart vault (e.g., smart vault 419) if the contents are in peril. In one or more embodiments, the vault locking mechanism uses an electronic keypad that can be electronically locked/unlocked by the SDV on-board computer, a remote computer, an authorized human user, etc.

As described herein, the determination as to whether or not to take a risk-lowering action (i.e., an action that reduces the risk/threat to cargo being transported within the smart vault) is based on a risk-level R. Risk-level R is affected by such factors as one or more of: the SDV deviating from a planned route; a break-in to the SDV; an SDV breakdown; a visual or other indication of intrusion into the SDV and/or the smart vault; a sensing/determination of the SDV being followed in an inappropriate fashion (e.g., being consistently followed despite numerous turns, lane changes, etc.); sensing/determination of inappropriate behavior of a vehicle in front of the SDV (e.g., a car in front of the SDV is slowing down for no known traffic or other reason); an assessment of the value of vault contents, current weather conditions and/or traffic that affect road/travel conditions, etc.

The risk-level R may also be a function of speed, weather, etc. For example, if the SDV is traveling at 45 mph, the risk of attack on the cargo by a pedestrian is much lower than if the SDV is traveling at only 3 mph, since it is physically impossible for a pedestrian to board the SDV when it is traveling at 45 mph (but relatively easy if the SDV is only traveling at 3 mph).

A determination is made to determine if the risk-level R is above a certain threshold. For example, assume that an algorithm uses various parameters to derive a certain value. A simple algorithm may be:

$$R=((1/\text{current speed of the SDV})\times 100)+(\text{monetary value of the vault content})$$

In this simple example, if the speed of the SDV is 5 (mph) and the monetary value of the vault content is 5000 (USD), then $$R=((1/5)\times 100)+(5000)=20+5000=5020$$

Once the risk-level R is determined to be above a certain threshold (e.g., greater than 2000), then a risk-lowering action is performed. Examples of such risk-lowering actions include one or more of: directing the SDV to take a different route; sending an emergency signal to a monitoring computer, other SDVs, etc.; deploying extra protections within the SDV (e.g., adjusting a suspension system on the SDV in order to be able to make aggressive movements) or smart vault (e.g., triggering additional locks); allowing local authorities to take control of the SDV and/or the contents of the SDV; requesting backup from a drone or another SDV to take possession of the contents of the smart vault and/or the smart vault itself; deploying a dye onto the contents of the smart vault (thus making it easy to identify when recovered and unusable by the thief); adjusting the operations of the SDV, such as changing the speed and direction of the SDV, sounding an alarm or lighting a light, deploying an odorant or gas, blasting an audible warning, deploying extra video sensors, etc.; deploying a sticky foam consisting of various tacky and/or tenacious materials carried in compressed form with a propellant that is used to block, entangle, and impair devices used to attack the smart vault; etc.

In one or more embodiments of the present invention, the smart vault directly controls the SDV, such as controlling/directing the movement of the SDV (i.e., the smart vault directs the SDV to take certain evasive actions in order to protect the smart vault and its contents). Assuming that the smart vault is logically compatible (i.e., is able to issue instructions to) other SDV on-board computers, then when the smart vault is moved from one SDV to another, the smart vault is still able to control the next SDV it is deployed in.

In one or more embodiments of the present invention, the smart vault is communicably connected to a "diversion safe". A diversion safe/vault is a container that is physically separate from the smart vault and may contain no valuables, but is carried within the SDV to divert attention/attack from the smart vault carrying contents that need to be protected. In one embodiment, the diversion safe may contain sensors that record data pertaining to its integrity, condition, position, etc. In the event that a diversion safe is compromised, it may communicate sensor data to the smart vault to send information including a time of attack, method of attempted opening, etc. The smart vault may then use this data to determine evasive actions for the SDV to protect the smart vault and its contents.

In one or more embodiments of the present invention, smart vaults are able to communicate with one another, including diversion safes. A diversion vault (also known as a "hidden safe") is a vault/safe that is made from (or incorporated with) an otherwise ordinary object in the SDV. For example, a first vault/safe may be hidden inside of an armrest within a cabin of the SDV, while a second vault/safe may be hidden under a floorboard of the SDV. These two vaults/safes may communicate with one another electronically. For example, assume that a first vault/safe detects that an unauthorized attempt is being made to open the first vault/safe. The first vault/safe may then send a message to the second vault/safe, directing it to activate its lock, etc. in order to be prepared for an attack. These messages may be protected with encryption schemes and data protection schemes such as using transport layer security (TLS) or even encrypted IEEE 802.13.1 communications.

In one or more embodiments, SDVs are able to communicate with one another (via their respective SDV on-board computers 301 shown in FIG. 3), in order to advise one another regarding real-time assaults/treats being experienced, recommendations for alternate routes, etc., such that the various SDVs are "looking out for" one another.

In one or more embodiments of the present invention, the smart vault has one or more sensors, whose output is used when carrying out real-time risk assessments and learning about risks. The sensors may include one or more of: geolocation sensors that can directly communicate with a global positioning system (GPS) satellite or GPS provider over protected channels for determining the real-time location of the smart vault; gyroscopes (to detect rolling and other movement of the smart vault); accelerometers (to detect jostling and other movement of the smart vault); altitude measurement sensors (to determine whether the SDV or the smart vault is being lifted); thermal sensors (to determine if the vault is being subjected to heat (e.g., a cutting torch or incendiary device)); etc.

As described herein, in one or more embodiments of the present invention the smart vault takes over partial or full control of the SDV driving movements and/or route based on the perceived risk.

In various embodiments, the smart vault keeps track of routes and any attacks, such as detachment of the smart vault from the SDV, sudden movements to the smart vault, lifting of the smart vault, rolling the smart vault, etc. One or more processors within the smart vault (or within a monitoring computer or an SDV on-board computer) can then "learn" patterns of threats to the smart vault or other smart vaults, and will adjust the configuration of the smart vault and/or the movement of the SDV accordingly. For example, if a pattern of attacks shows that the smart vault is grabbed off the SDV when the SDV is traveling at less than three miles per hour, then the smart vault will automatically lock its locking mechanism whenever the SDV is traveling at less than three miles per hour (or else comes to a stop). Although the smart vault could simply always be locked during transport, allowing it to be selectively locked in accordance with one or more embodiments described herein allows the smart vault to quickly and readily accessible, unless a threat is perceived If desired, the SDV and vault operations and geolocation are shared with a set of mobile devices/users as defined by various policies. That is, the geolocation of the SDV/vault may be used to open and close the smart vault, place and retrieve items from the smart vault, etc. For example, every time the geolocation (e.g., GPS) system detects that the SDV has arrived at a certain location, the smart vault may be unlocked and opened (in order to allow contents to be inserted or removed) or else closed and locked (in order to protect the contents of the smart vault).

Placing high-value items in an SDV may require separation of duties (SOD), just as receiving high-value items from an SDV may require separation of duties. That is, only certain actors and/or devices may be authorized to load and unload items from a smart vault. For example, a certain aerial drone may be authorized to pick up items from a particular smart vault. As such, this certain aerial drone is one of one or more "authorized drones". When an authorized drone sends an identification signal to the smart vault, the smart vault will unlock and open its (e.g., top) door, allowing the drone to access the interior of the smart vault. If an unauthorized drone sends a different (unauthorized) identification signal, the smart vault remains (or becomes) locked, thus barring unauthorized drone access.

Any time that placement and/or receipt of high-value items are carried out, the geolocation may be noted. In addition, identities of owners of the high-value items, identities of human loaders or unloaders of the high-value items, identities of third-party shipping coordinators, identities of recipients of the high-value items, identities of passengers/guards/other persons riding along in the SDV with the high-value items, etc., may be noted when available and appropriate. Provenance of all such information for each event and for each period of time may be recorded and shared with others as defined by a policy for protecting the contents of the smart vault.

With reference now to FIG. 2, an exemplary self-driving vehicle (SDV) 202 is depicted traveling along a roadway 204. Assume now that SDV 202 has been tasked by supervisory computer 201 to transport the contents of a smart vault 219 from a pickup location 206 to a delivery location 208.

The condition of the roadway 204 and its environment may be detected by roadway environmental sensor(s) 210 (e.g., sensors that detect how dark roadway 204 is, whether it is raining at a point along roadway 204, how rough (e.g., potholed) the roadway 204 is between pickup location 206 and delivery location 208, if the roadway 204 is flooded, if there are fires in the area, etc.).

Various factors can influence the level of threat to the contents of the smart vault 219. For example, vehicle 212 (which may or may not be another SDV) may be driving in a manner that suggests that a highjacking is eminent (e.g., "boxing in" SDV 202). Similarly, sensors on the smart vault 219 may indicate that an unauthorized person is attempting to break into or else remove entirely the smart vault 219. As described herein, such factors will results in changes to the operation of the SDV 202 and/or the state of the smart vault 219.

Figure 3:
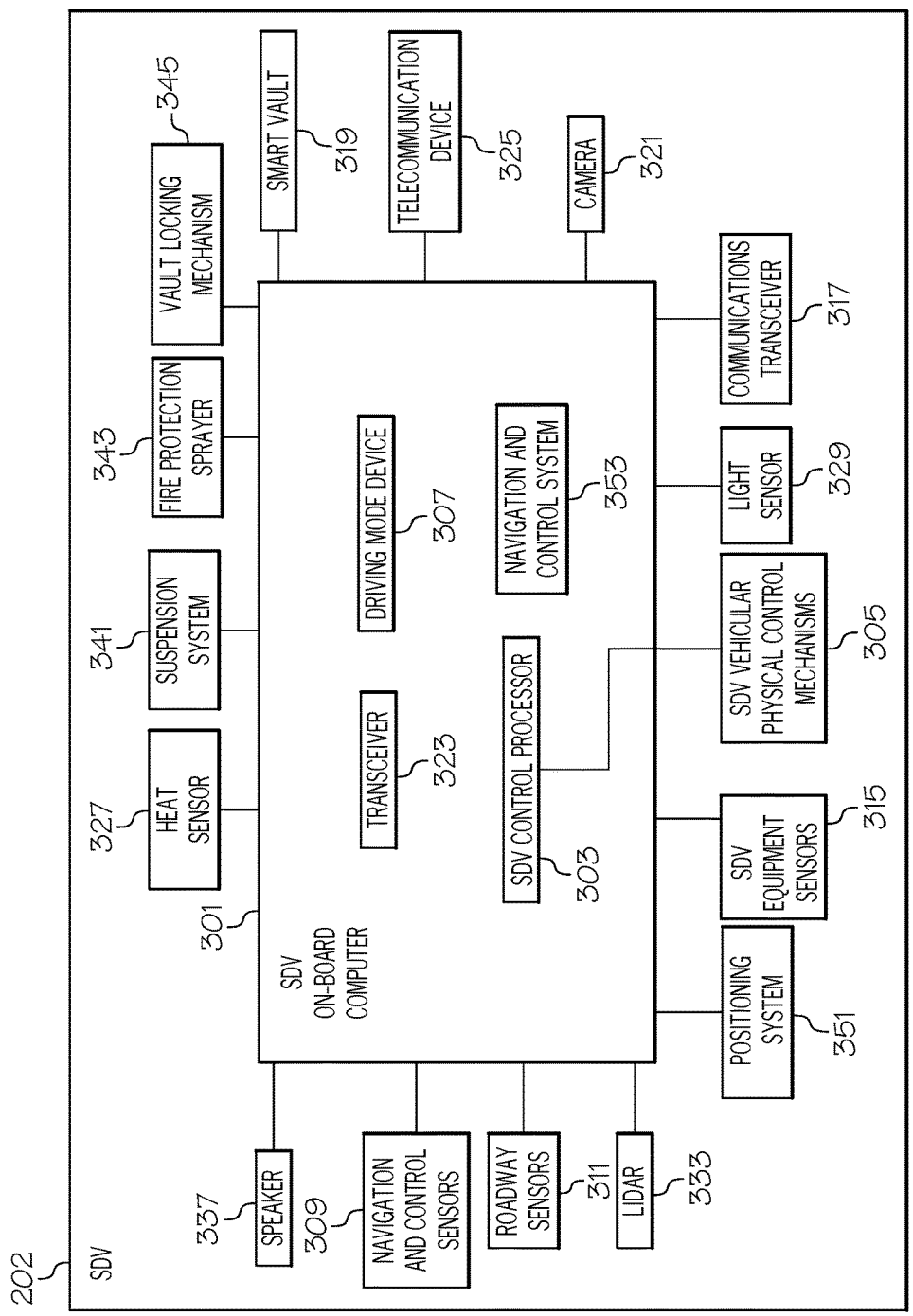
FIG. 3 depicts additional exemplary detail within an SDV in accordance with one or more embodiments of the present invention.

With reference now to FIG. 3, additional details of one or more embodiments of the SDV 202 are presented.

As shown in FIG. 3, SDV 202 has an SDV on-board computer 301 that controls operations of the SDV 202. According to directives from a driving mode device 307, the SDV 202 can be selectively operated in manual mode or autonomous mode. In some embodiments, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense/determine the presence of other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) (e.g., LIDAR 333 shown in FIG. 3) or Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, whereby the presence and location of other physical objects can be ascertained by the SDV on-board computer 301. In one or more embodiments, different SDVs are able to directly communicate with one another in order to let one another know their relative positions. That is, a first SDV may transmit its GPS coordinates to a second SDV (and vice versa), thus allowing the first SDV and the second SDV to know the current real-time GPS-coordinate location of the other SDV.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

As shown in FIG. 3, a navigation and control system 353 uses information from navigation and control sensors 309 to drive the SDV 202 along a pre-programmed route. Navigation and control system 353 may be a stand-alone system, or may be an integration of one or more components (e.g., SDV control processor 303, navigation and controls sensors 309, etc.) shown in FIG. 3.

In one or more embodiments of the present invention, SDV 202 includes roadway sensors 311 that are coupled to the SDV 202. Roadway sensors 311 may include sensors that are able to detect the amount of water, snow, ice, etc. on the roadway 204 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 204 is using light sensors (e.g., light sensor 329).

In one or more embodiments of the present invention, a camera 321 can be movably trained on roadway 204, in order to provide photographic images of conditions on the roadway 204 upon which the SDV 202 is traveling. In one or more embodiments of the present invention, the camera 321 will compare real-time images of roadway 204 with past images of roadway 204, in order to determine any changes to the condition of the roadway 204.

In one or more embodiments of the present invention, camera 321 can also be trained on cargo during loading, transporting, and unloading. That is, camera 321 can capture images of a smart vault 319 (analogous to smart vault 219 shown in FIG. 2) and/or its contents (assuming camera 321 is able to see inside of smart vault 319) during loading, transport, and/or unloading.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. Of course, if the SDV 202 is truly in autonomous mode, the condition of the wipers is likely to be insignificant.

In one or more embodiments of the present invention, also within SDV 202 is a communications transceiver 317, which is able to receive and transmit electronic communication signals (e.g., RF messages) from and to other communications transceivers found in other vehicles, servers, supervisory computers, etc.

In one or more embodiments of the present invention, also within SDV 202 is a telecommunication device 325 (e.g., a smart phone, a cell phone, a laptop computer, etc.), which may be connected (e.g., via a IEEE 802.15.1 communication connection) to the SDV on-board computer 301.

In one or more embodiments of the present invention, also within SDV 202 is a speaker 337 (depicted in FIG. 4 as speaker 437), which is able to broadcast instructions/warnings to persons attempting to hijack the smart vault 319 to leave the area. In an embodiment of the present invention, the communications transceiver 317 shown in FIG. 3 sends a text message (or a similar telecommunication message) to a smartphone of a user of the SDV 202 that an attack is taking place.

In one or more embodiments of the present invention, also within SDV 202 is a positioning system 351, which is analogous to the positioning system 151 (e.g., a GPS system) described in FIG. 1.

In one or more embodiments of the present invention, an adjustable suspension system 341 is in electrical communication with SDV on-board computer 301. Adjustable suspension system 341 includes, but is not limited to, adjustable (e.g., pneumatic) shock absorbers, torsion bars, etc. that can be dynamically adjusted by activating pneumatic pumps, actuators, electromechanical gears, etc. to adjust the ride of the SDV 202. That is, by adjusting the adjusting suspension system 341 (analogous to adjustable suspension system 441 in FIG. 4), the SDV 202 is able to perform more aggressive maneuvers in order to elude a potential hijacker.

In one or more embodiments of the present invention, also within SDV 202 is a fire protection sprayer 343 (shown in FIG. 4 as fire protection sprayer 443), which, upon detecting by a heat sensor 327 that heat is being applied to the smart vault 319, will spray a fire protection material (e.g., foam) onto the smart vault 319.

Figure 4:
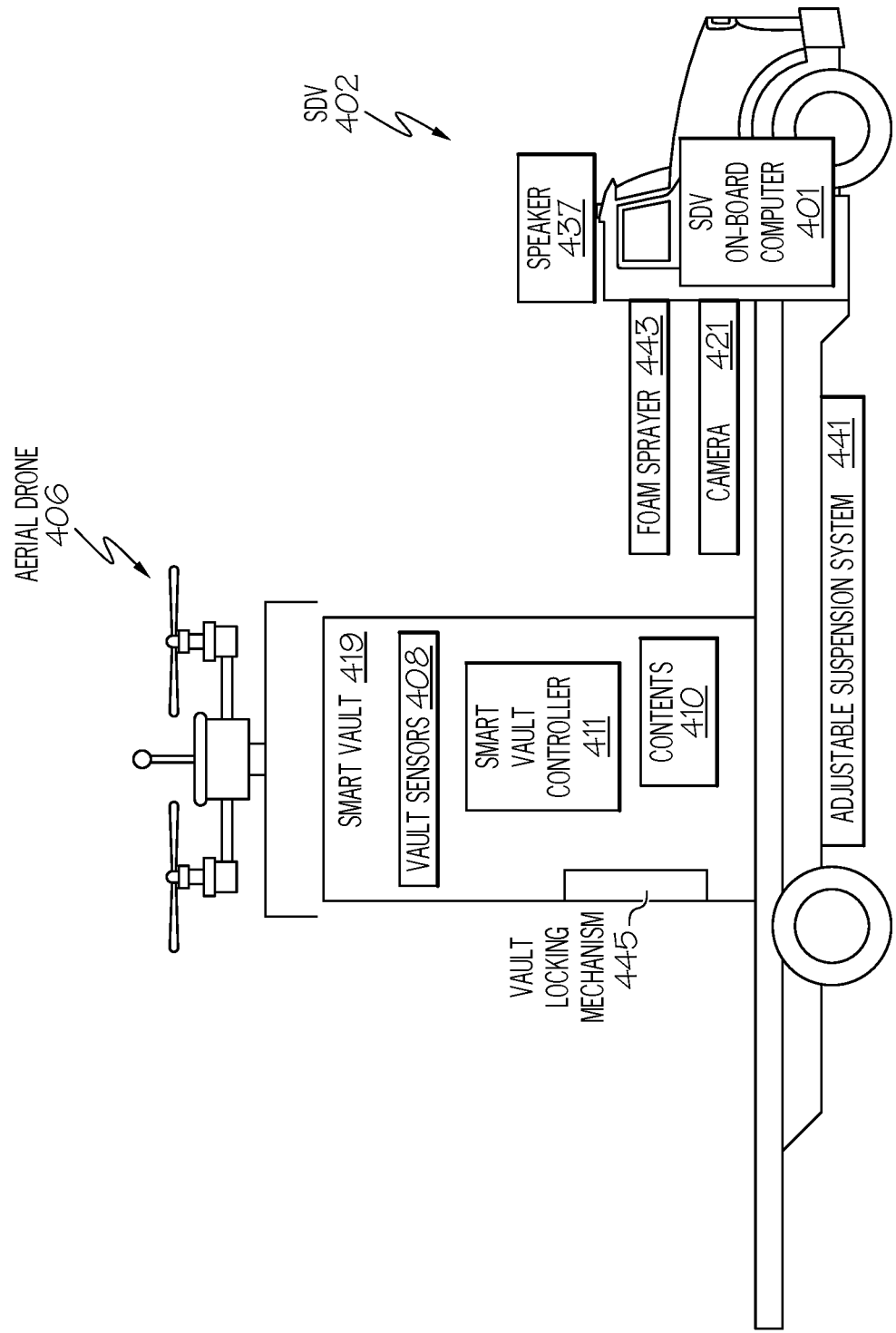
FIG. 4 illustrates additional detail of an exemplary SDV in accordance with one or more embodiments of the present invention.

In one or more embodiments of the present invention, also within SDV 202 and/or the smart vault 319 is a vault locking mechanism 345 (shown in FIG. 4 as vault locking mechanism 445), which is an electromechanical lock (controllable by either the smart vault controller 411 shown in FIG. 4 as part of smart vault 419 or by the SDV on-board computer 301 shown in FIG. 3) that secures/controls access to the interior of the smart vault 319/419.

In one or more embodiments of the present invention, vault locking mechanism 445 (shown in FIG. 4) is an intelligent lock on the smart vault 419 that requires authentication or an electronic handshake from the SDV 402, the SDV's GPS system (e.g., part of positioning system 151 when incorporated into SDV 402), and/or a remote second-party (e.g., using supervisory computer 201 or a smart phone that is in communication with the vault locking mechanism 445) before the smart vault 419 can be opened.

In one or more embodiments of the present invention, one or more of the microphone 331, communications transceiver 317, camera 321, telecommunication device 325, vault locking mechanism 345, fire protection sprayer 343, heat sensor 327, and speaker 337 are components of the smart vault 319/419.

In one or more embodiments of the present invention, the smart vault 419 communicates with the SDV on-board computer 401 (analogous to SDV on-board computer 301 shown in FIG. 3) within the SDV 402 using hard-wired Ethernet, Wi-Fi, or wireless network, with all communications protected using Secure Socket Layer (SSL). SSL is a cryptographic protocol that provides communication security over a network. SSL uses asymmetric cryptography for authentication of key exchange, symmetric encryption for confidentiality, and message authentication codes for message integrity. The SSL protocol allows applications to communicate across a network in a way designed to prevent eavesdropping and tampering. In one or more embodiments of the present invention, the smart vault 419 initiates all communications, such that all communication traffic from the smart vault 419 is outgoing. In this embodiment, the SDV on-board computer 401 has information that allows it to penetrate any communication firewalls in the smart vault controller 411 in order to allow incoming communication traffic to the smart vault 419.

As shown in FIG. 4, one or more vault sensors 408 are able to detect a level of movement (e.g., jostling or abnormal acceleration) of the smart vault 419, tilting and sliding of the smart vault 419, temperature and wetness of the smart vault 419, etc., indicative of imminent theft by unauthorized people/persons.

Figure 5:
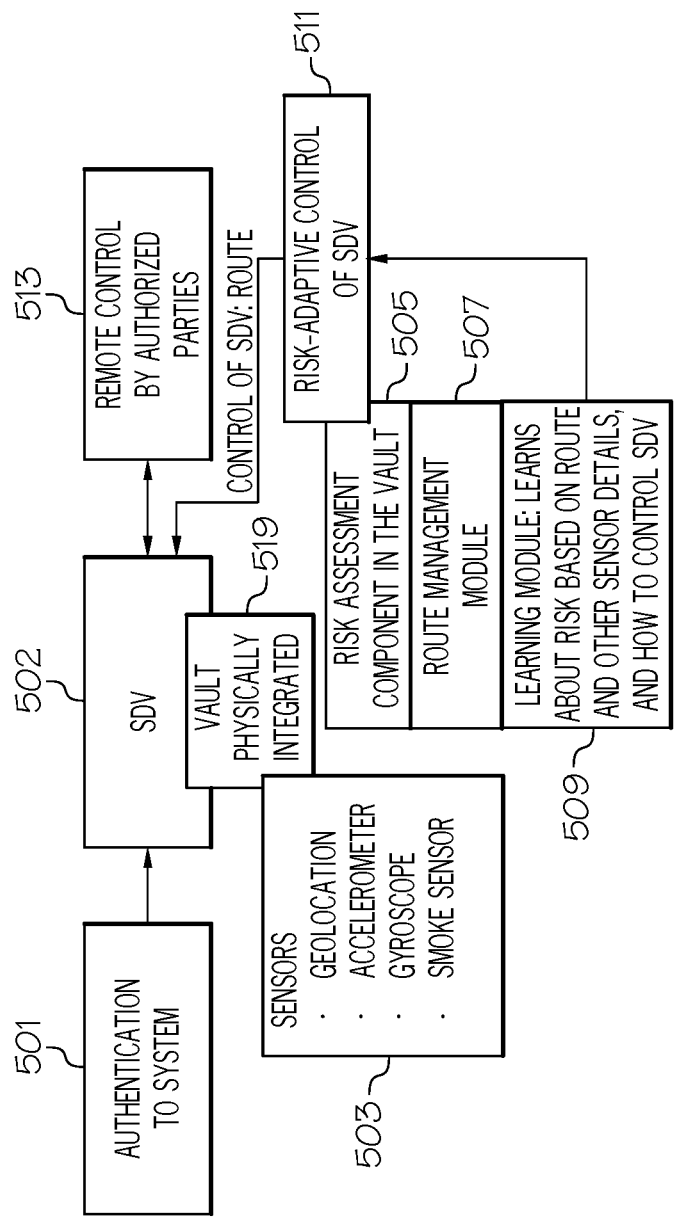
FIG. 5 depicts an overview of various components/actions in accordance with one or more embodiments of the present invention.

With reference now to FIG. 5, an overview of exemplary steps performed by hardware and/or logic within the smart vault and/or SDV described herein is presented.

One or more embodiments of the present invention assume that high-value items are about to be placed in the smart vault, such as cash, gems, rare coins, stamps, certificates, controlled medicines, jewelry, etc., as well as hard to replace items such as photos, hard drives, paperwork, real estate property deeds and warranties, bank and investment account numbers, stocks/bonds, collectibles, etc.

As shown in block 501 in FIG. 5, the smart vault is authenticated to a system (e.g., supervisory computer 201 shown in FIG. 2) with respect to geolocation. For example, if a certain transport policy allows particular (specific or types of) items to be placed into the smart vault at a certain geolocation, then the supervisory computer 201 and/or the SDV on-board computer 301 and/or the smart vault controller 411 will allow/enable placement of such specific items or types of items to be placed within the smart vault.

Once the items are placed within the vault 519 (analogous to smart vault 219 shown in FIG. 2) that is physically integrated with the SDV 502 (analogous to SDV 202), the vault 519 is locked for transport to the destination geolocation (e.g., delivery location 208). In one or more embodiments of the present invention, geolocations are verified using cryptographically secure protocols.

In one or more embodiments of the present invention, the smart vault 519 is allowed to be unlocked only at the destination geolocation. If there are multiple geolocations, where the items shall be distributed/disbursed, a protocol is used to provide an order and mapping of items to be disbursed. Whether the items are received by the recipients at a destination is noted by both the recipients and any human passengers. Each placement and distribution is recorded and may be communicated in real-time to interested parties by one or more cameras (e.g., camera 421 shown in FIG. 4) mounted on the SDV 402. The SDV may also enable other protection measures such as driving directly to a new destination in the event of theft of items or an attempted attack. In one or more embodiments, the destination maybe pre-defined or defined dynamically.

As shown in FIG. 5, various sensors 503 (e.g., configured to establish geolocation, acceleration, heat, smoke, tilting, etc. of the smart vault and/or its contents) tell the SDV 502 (more specifically processors within the SDV 502 and/or the vault 519 and/or the supervisory computer 201 shown in FIG. 2) that an attack is being levied against the contents of the vault 519. This assessment (of the existence of the attack) is performed by a risk assessment component in the vault (see block 505) or by SDVCL 147 shown in FIG. 1, which determines the presence of an intrusive action against the vault 519, irregular driving by vehicles such as 212 shown in FIG. 2, the presence of undue movement or heat against the vault 519, etc.

Once the system determines that an attack is occurring (or is imminent), a route management module (see block 507) within the SDV on-board computer 301 and/or supervisory computer 201 determines the best evasive route for the SDV 502 to take in order to get away from the attack/attacker.

As described in block 509, a learning module (e.g., within SDV on-board computer 301) heuristically learns the safest routes to take (based on historical data derived from past hijacking events), the best evasive maneuvers/routes to take after a hijacking event occurs or is determined to be imminent (based on the experiences of SDV 502 and/or other SDVs), and how to most effectively and safely control the SDV 502 during escape and evasion from the scene of the attack. These factors lead to a risk-adaptive control of SDV 502 (see block 511), which directs the SDV on-board computer 301 to maneuver the SDV 502 away from the attack site.

As shown in block 513, in one or more embodiments of the present invention, authorized parties are able to remotely control (e.g., via supervisory computer 201 shown in FIG. 2) the movements and actions of the SDV 502, as well as the equipment (e.g., fire protection sprayer 343, vault locking mechanism 345, etc.) on the SDV 502 in the event of an attack or attempted attack on the vault 519.

In another embodiment of the present invention, the vault may be programmed to destroy or sequester the documents/items within the vault by causing a shredding, an embedding within plastic, a marking with dye, a risk-free burning/blackening, etc., i.e., as a "last resort" in very special circumstances. For example, when a risk-level R (discussed below) goes beyond a level L, a security policy may be in place describing that when the items are within the vault are in the danger of being in the hands of unauthorized personnel (such as paper documents containing security keys, passwords, or even other papers), the vault may, optionally, destroy the papers.

Figure 6:
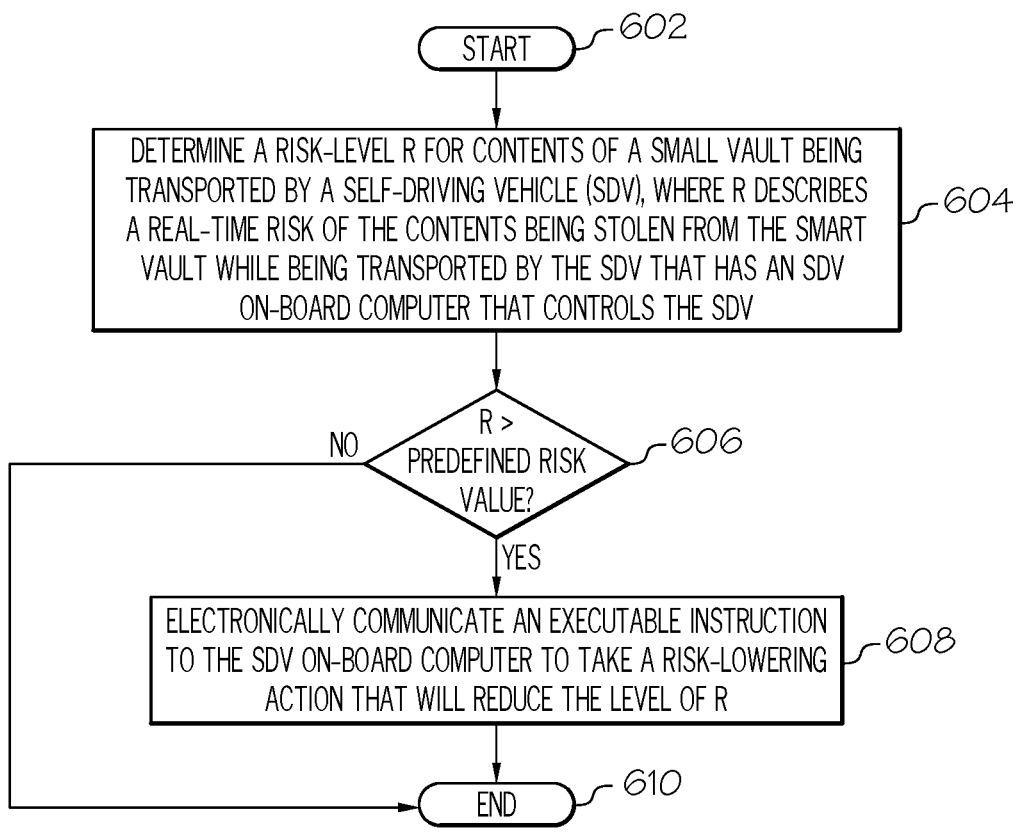
FIG. 6 is a high-level flow chart of one or more steps of one or more embodiments of the present invention.

With reference now to FIG. 6, a high-level flow chart of one or more steps performed by one or more processors and/or other hardware devices to protect contents of a smart vault being transported by a self-driving vehicle (SDV) is presented.

After initiator block 602, one or more processors (e.g., within supervisory computer 201 and/or SDV on-board computer 301 and/or smart vault controller 411) determine a risk-level R for contents of a smart vault (e.g., smart vault 419) being transported by a self-driving vehicle (SDV), such as SDV 402. R describes a real-time risk of the contents being stolen from the smart vault while being transported by the SDV that has an SDV on-board computer that controls the SDV, as described in block 604.

As described herein, R can be determined based on various factors. For example, assume that R has a base value of 1.0, which causes no changes to how the SDV is maneuvered, or how the smart vault is configured, etc. From this base value, various events/conditions that are detected by one or more sensors (described in FIG. 3) can then increase the value of R.

For example, a positioning system (e.g., positioning system 351 shown in FIG. 1) may detect the SDV is deviating from a planned route (i.e., the SDV is taking a route other than what was programmed into the SDV on-board computer 301, thus suggesting that the navigation and control system 353 may have been hacked. Based on this factor, the value of R is increased.

In another embodiment, a sensor system (e.g., vault sensors 408) may detect that the smart vault is being breached. For example, the vault sensors 408 may sense that the vault locking mechanism 445 has been opened, that the smart vault 419 has been beaten open by a sledgehammer, etc., or heated to a temperature that indicates a cutting torch, etc., is being used to open the smart vault. Based on this factor, the value of R is increased.

In another embodiment, the SDV on-board computer 401 may receive readings from various sensors (e.g., equipment sensors 315 shown in FIG. 3) that the SDV has experienced a mechanical breakdown, which may or may not have been caused by an attacker. Based on this factor, the value of R is increased.

In another embodiment, one or more processors (e.g., within SDV on-board computer 301) may detect (from one or more sensors shown in FIG. 3) a pre-defined anomalous movement by one or more vehicles that are in proximity to the SDV (e.g., vehicle 212 boxing in SDV 202). Based on this factor, the value of R is increased.

In another embodiment, one or more processors (e.g., within supervisory computer 201) may have access to a manifest (listing of the contents) of the smart vault, which includes a monetary value of these contents, showing that the contents of the smart vault exceeds some predetermined value. Based on this factor, the value of R is increased.

In another embodiment, one or more sensors (e.g., roadway environmental sensors 210) may detect that inclement weather is occurring at a current location of the SDV. Assuming that this type of inclement weather has been predetermined to pose a threat to the contents of the smart vault (e.g., increased the risk of the SDV 202 to skid off the road, that the smart vault 219 has an open top and the contents are at risk of getting wet, etc.), then the value of R is increased.

In another embodiment, a sensor on the SDV (e.g., positioning system 351) detects that the SDV is moving at a velocity that is less than a predefined value (e.g., less than three miles per hour or is stopped), thus leading the increased exposure of the smart vault being manually or mechanically lifted off the SDV. Based on this factor, the value of R is increased.

Returning to FIG. 6, a query is made in query block 606 as to whether R is greater than a predefined risk value. If so (block 608), then one or more processors (e.g., within smart vault controller 411) electronically communicate an executable instruction to the SDV on-board computer to take a risk-lowering action that will reduce the level of R.

In an embodiment of the present invention, this executable instruction is transmitted wirelessly from the smart vault to the SDV on-board computer.

In an embodiment of the present invention, if the SDV is traveling along a planned route, the risk-lowering action is the SDV taking a new route that is different from the planned route. That is, if the SDV determines that an attack is imminent or is occurring, then the SDV will take a new (and hopefully unexpected) different route, in order to elude the attacker.

In an embodiment of the present invention, the risk-lowering action is transmitting an emergency signal (e.g., from the smart vault 219 or the SDV 202 to the supervisory computer 201) that describes the fact that R is currently exceeding the predefined risk value.

In an embodiment of the present invention, the risk-lowering action is the deployment of additional vault locking protection on the smart vault. For example, if the smart vault 419 shown in FIG. 4 has multiple vault locking mechanisms 445, and if only one is currently locked when R exceeds the predefined risk value, then addition vault locking mechanisms 445 are activated in order to provide additional protection to the smart vault 419.

In an embodiment of the present invention, the risk-lowering action is modifying a configuration of the SDV. For example, if R exceeds the predefined risk value, then SDV vehicular physical control mechanisms 305 and the suspension system 341 on the SDV 202 is adjusted in order to enable the SDV 202 to make more aggressive driving movements when eluding the threat.

In an embodiment of the present invention, the risk-lowering action is transferring the contents of the smart vault to an aerial drone. For example, assume that smart vault 419 determines that contents 410 are doomed to being stolen, despite what actions the SDV 402 may perform. However, an aerial drone 406 (which may be carried on the SDV 402) may be deployed to physically lift the smart vault 419 (or at least the contents 410) off the SDV 402 and away from the threat.

In an embodiment of the present invention, the risk-lowering action is activating a fluid dispenser (e.g., foam sprayer 443 shown in FIG. 4) to dispense an anti-theft fluid on the smart vault, wherein the anti-theft fluid makes the smart vault inaccessible to a person. For example, foam sprayer 443 may spray a sticky substance, an oily substance, or any other substance onto the exterior of the smart vault 419, making it difficult, if not impossible, for a highjacker to lift/remove the smart vault 419 off of the SDV 402.

The flow chart shown in FIG. 6 ends at terminator block 610.

While the present invention has been discussed in terms of protecting a high-value object (e.g., cargo), the features presented herein may also be applied to transporting persons. For example, if a very important person (i.e., a VIP such as a political figure, a very wealthy person, etc.) whose security is to be protected (e.g., from kidnapping), the smart vault described herein may actually be a cabin of the SDV, which is selectively locked/unlocked in accordance with one or more embodiments described herein.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
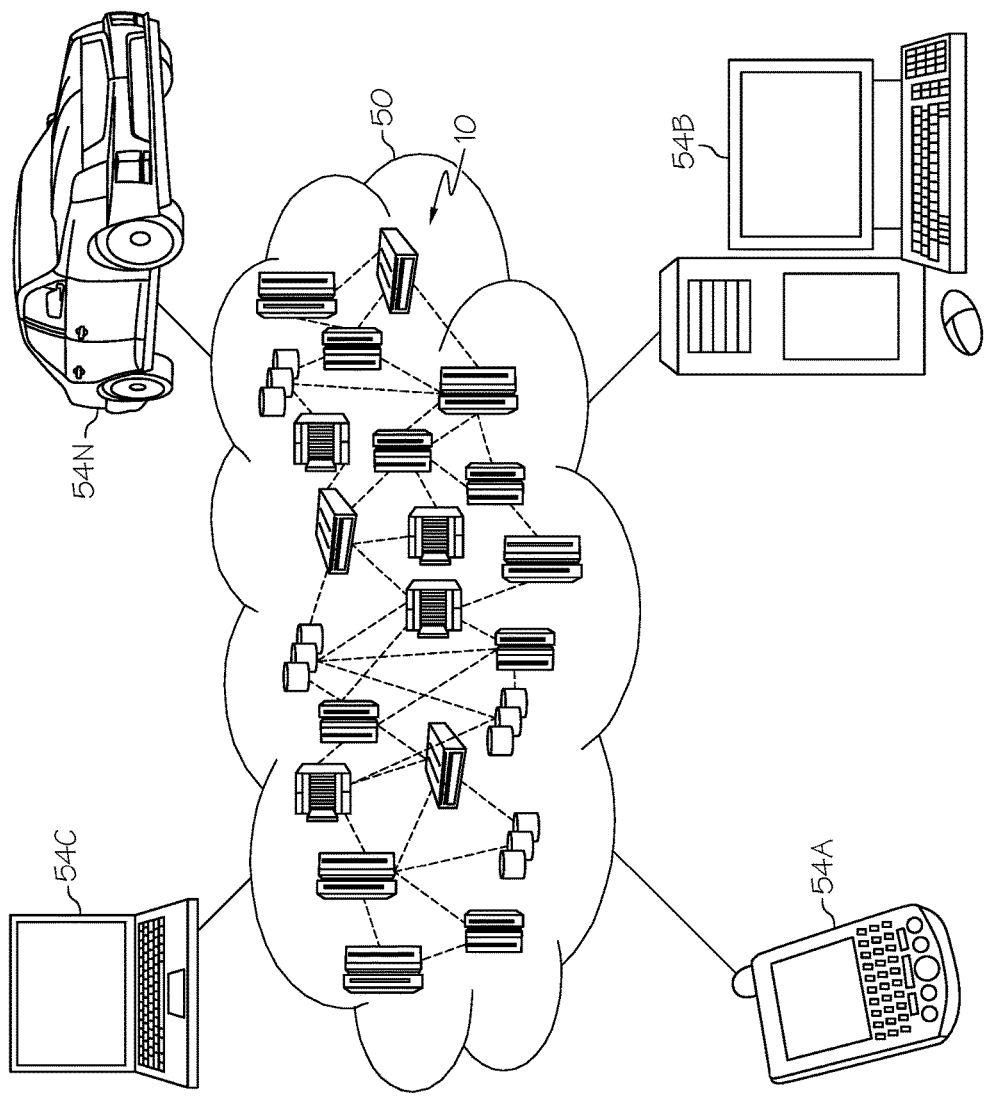
FIG. 7 depicts a cloud computing environment according to an embodiment of the present invention.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
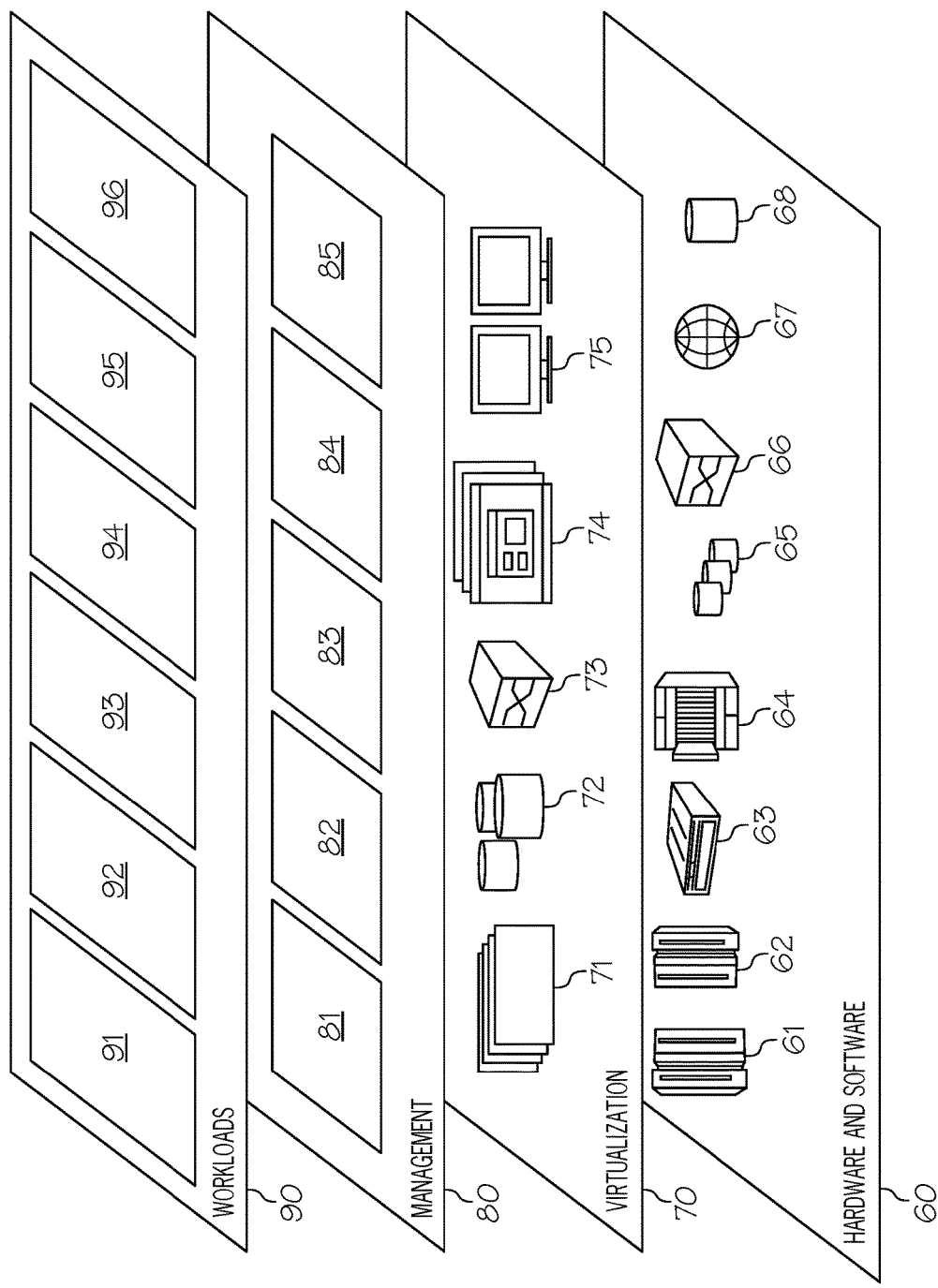
FIG. 8 depicts abstraction model layers of a cloud computing environment according to an embodiment of the present invention.

Referring now to FIG. 8, an exemplary set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SDV management processing 96, in accordance with one or more embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The present invention may be implemented through the use of a Very High Speed Integrated Circuit (VHSIC) Hardware Description Language (VHDL) program. VHDL is an exemplary design-entry language for describing an integrated circuit, such as a Field Programmable Gate Arrays (FPGA), Application Specific Integrated Circuit (ASIC), and other similar electronic devices. In other words and by way of example only, a software-implemented method according to one or more embodiments of the present invention may be emulated by a hardware-based VHDL program, which is then implemented in a VHSIC, such as a FPGA.

Having thus described embodiments of the present invention, in detail and by reference to illustrative embodiments thereof, it will be apparent that modifications and variations are possible without departing from the scope of the present invention defined in the appended claims.

What is claimed is:

1. A computer-implemented method comprising:
    determining, by one or more processors, a risk-level R for contents of a smart vault being transported by a self-driving vehicle (SDV), wherein R describes a real-time risk of the contents being stolen from the smart vault while being transported by the SDV that has an SDV on-board computer that controls the SDV; and
    in response to determining that R is greater than a predefined risk value, electronically communicating, by one or more processors, an executable instruction to the SDV on-board computer to take a risk-lowering action that will reduce the level of R.

2. The computer-implemented method of claim 1, wherein the executable instruction is transmitted wirelessly from the smart vault to the SDV on-board computer.

3. The computer-implemented method of claim 1, wherein the smart vault is from a group consisting of a safe, a deposit box, and a cargo compartment of the SDV.

4. The computer-implemented method of claim 1, further comprising:
    detecting, by a positioning system, that the SDV is deviating from a planned route; and
    increasing, by one or more processors, R based on the SDV deviating from the planned route.

5. The computer-implemented method of claim 1, further comprising:
    detecting, by a sensor system, that the smart vault is being breached; and
    increasing, by one or more processors, R based on the smart vault being breached.

6. The computer-implemented method of claim 1, further comprising:
    detecting, by one or more sensors on the SDV, that the SDV is experiencing a mechanical breakdown; and
    increasing, by one or more processors, R based on the SDV experiencing the mechanical breakdown.

7. The computer-implemented method of claim 1, further comprising:
    detecting, by one or more processors, pre-defined anomalous movement by one or more vehicles that are in proximity to the SDV; and
    increasing, by one or more processors, R based on the pre-defined anomalous movement by the one or more vehicles that are in proximity to the SDV.

8. The computer-implemented method of claim 1, further comprising:
    determining, by one or more processors, that the contents of the smart vault exceed a predefined value; and
    increasing, by one or more processors, R based on the contents of the smart vault exceeding the predefined value.

9. The computer-implemented method of claim 1, further comprising:
    detecting, by one or more sensors, inclement weather at a current location of the SDV, wherein the inclement weather has been predetermined to pose a threat to the contents of the smart vault; and
    increasing, by one or more processors, R based on the inclement weather at the current location of the SDV.

10. The computer-implemented method of claim 1, further comprising:
    detecting, by a sensor on the SDV, that the SDV is moving at a velocity that is less than a predefined value; and
    increasing, by one or more processors, R based the SDV moving at the velocity that is less than the predefined value.

11. The computer-implemented method of claim 1, wherein the SDV is traveling along a planned route, and wherein the risk-lowering action is the SDV taking a new route that is different from the planned route.

12. The computer-implemented method of claim 1, wherein the risk-lowering action is transmitting an emergency signal that describes R exceeding the predefined risk value.

13. The computer-implemented method of claim 1, wherein the risk-lowering action is a deployment of additional vault locking protection on the smart vault.

14. The computer-implemented method of claim 1, wherein the risk-lowering action is modifying a configuration of the SDV.

15. The computer-implemented method of claim 1, wherein the risk-lowering action is transferring the contents of the smart vault to an aerial drone.

16. The computer-implemented method of claim 1, wherein the risk-lowering action is activating a fluid dispenser to dispense an anti-theft fluid on the smart vault, wherein the anti-theft fluid makes the smart vault inaccessible to a person.

17. A computer program product for protecting contents of a smart vault being transported by a self-driving vehicle (SDV), the computer program product comprising:
   program instructions executable by a device to determine a risk-level R for contents of a smart vault being transported by a self-driving vehicle (SDV), wherein R describes a real-time risk of the contents being stolen from the smart vault while being transported by the SDV that has an SDV on-board computer that controls the SDV; and
   program instructions executable by the device to, in response to determining that R is greater than a predefined risk value, electronically communicate an executable instruction to the SDV on-board computer to take a risk-lowering action that will reduce the level of R.

18. The computer program product of claim 15, wherein the program instructions are executable by the device to cause the device to provide a service in a cloud environment.

19. A system comprising:
   one or more processors;
   one or more computer readable memories operably coupled to the one or more processors; and
   one or more computer readable storage mediums having program instructions stored on at least one of the one or more storage mediums for execution by at least one of the one or more processors via at least one of the one or more memories, the stored program instructions comprising:
   program instructions to determine a risk-level R for contents of a smart vault being transported by a self-driving vehicle (SDV), wherein R describes a real-time risk of the contents being stolen from the smart vault while being transported by the SDV that has an SDV on-board computer that controls the SDV; and
   program instructions to, in response to determining that R is greater than a predefined risk value, electronically communicate an executable instruction to the SDV on-board computer to take a risk-lowering action that will reduce the level of R.

20. The system of claim 19, wherein the program instructions are executable by the system to cause the system to provide a service in a cloud environment.

* * * * *